Sept. 15, 1964　　　R. J. HURT ETAL　　　3,148,897
SWIVEL COUPLING WITH SPLIT THRUST RING
Filed Jan. 7, 1960
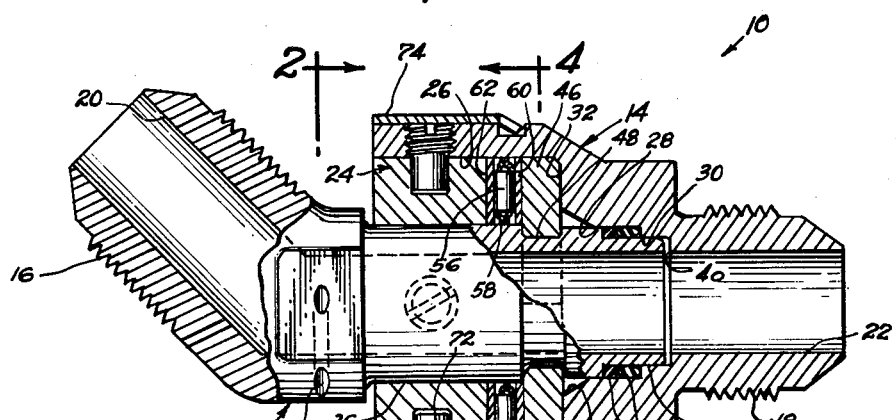
Fig. 1
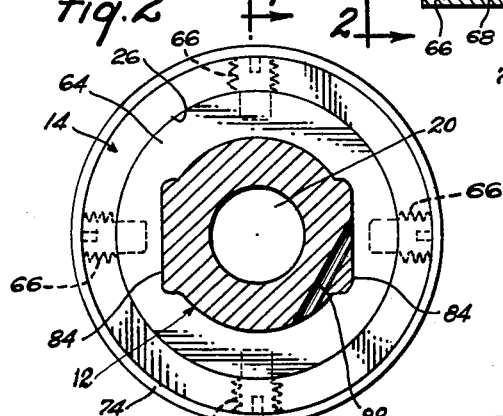
Fig. 2
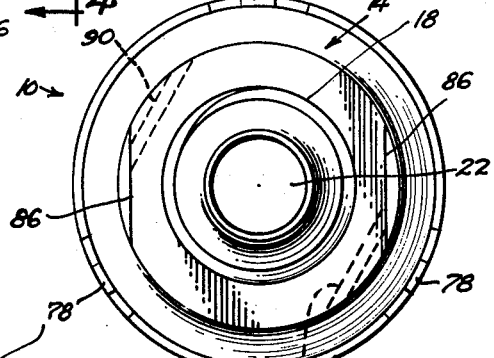
Fig. 3
Fig. 4
INVENTORS
Robert Hurt
Joseph Forni
BY
Ooms, McDougall, Williams & Hersh
Attorneys United States Patent Office 3,148,897
Patented Sept. 15, 1964

3,148,897
SWIVEL COUPLING WITH SPLIT THRUST RING
Robert J. Hurt and Joseph J. Forni, Geneva, Ill., assignors, by mesne assignments, to D. K. Manufacturing Company, Chicago, Ill., a corporation of Illinois
Filed Jan. 7, 1960, Ser. No. 986
2 Claims. (Cl. 285—98)

This invention relates to a swivel fitting for insertion between adjacent portions of a pipe, tubing or other conduit so as to provide for relative rotation between such portions.

One object of the present invention is to provide a new and improved swivel pipe fitting which may readily be disassembled and reassembled, so that the sealing ring, or any other component of the swivel fitting, may readily be replaced. The sealing ring is usually made of rubber, synthetic rubber, or a suitable plastic material. Thus, the sealing ring is subject not only to ordinary wear, but also to deterioration with age. Thus, it is considered the best practice to replace the sealing ring periodically, even if the swivel fitting has merely been held in stock as a replacement part, and has never been used. The present invention makes it possible to disassemble and reassemble the swivel fitting very easily, without any danger of damaging swivel fitting.

A further object is to provide a new and improved swivel fitting which is provided with an anti-friction thrust bearing, so that the swivel fitting will swivel freely and will last for a long time, even when the swivel fitting is employed to carry hydraulic fluid at an extremely high pressure.

Another object is to provide a new and improved swivel fitting of the foregoing character which is easy to manufacture and reasonably low in cost.

Further objects and advantages of the present invention will appear from the following description, taken with the accompanying drawings, in which:

FIG. 1 is an elevational view of a swivel fitting to be described as an illustrative embodiment of the present invention, the view being partly in section along a line 1—1 in FIG. 2.

FIG. 2 is a cross-sectional view, taken generally along the line 2—2 in FIG. 1.

FIG. 3 is an elevational view showing the right-hand end of the swivel fitting as seen in FIG. 1.

FIG. 4 is a cross-sectional view, taken generally along a line 4—4 in FIG. 1.

As already indicated, FIG. 1 illustrates a swivel pipe fitting 10 adapted to provide a swivel joint between sections of pipe, tubing or other conduit. The illustrated swivel fitting 10 comprises a body or inner member 12 which is rotatable within an outer member or nut 14. Provision is made for connecting fluid conduits to the inner and outer members 12 and 14. Thus, the inner and outer members 12 and 14 have externally threaded end portions 16 and 18. The inner and outer portions 12 and 14 are tubular in form, and thus are provided with substantially axial bores or passages 20 and 22 extending therethrough.

As shown, the axial passage 22 in the outer member 14 communicates with a stepped bore 24 having three portions 26, 28 and 30 which are successively smaller in diameter. Thus, the portion 26 is of relatively great diameter, the portion 28 is intermediate in diameter, and the portion 30 is of a relatively small diameter, only slightly larger than the passage 22. An annular substantially radial shoulder or wall 32 is formed between the portions 26 and 28 of the stepped bore 24. At the junction of the radial wall 32 and the intermediate bore portion 28, the outer member 14 is formed with an annular beveled corner surface 34.

The illustrated inner member 12 has a main cylindrical portion 36 and a reduced cylindrical end portion 38. It will be seen that the reduced end portion 38 extends into and is slidably received within the smaller bore portion 30, for rotation therein. An annular clearance space 40 is left between the inner end of the reduced portion 38 and the end of the bore 30.

The end of the cylindrical portion 36 of the inner member 12 extends into and is slidably received within the intermediate portion 28.

A sealing ring 42 is disposed between the reduced portion 38 of the inner member 12 and the bore 28 in the outer member 14. As shown, the sealing ring 42 may be in the form of an O-ring, made of synthetic rubber, natural rubber, or a suitable plastic material. The ring 42 is compressed between the inner and outer members 12 and 14 so as to prevent any leakage of fluid therebetween. In this case, the fluid pressure within the swivel fitting is applied against the right-hand side of the sealing ring 42, through the bore 30. It is preferred to back up the left-hand side of the sealing ring 42 with a back-up ring 44 made of Teflon, leather, or some other material which is especially resistant to being extruded by the fluid pressure into the clearance space between the inner and outer members.

The swivel fitting 10 is provided with an anti-friction thrust bearing arrangement, so that the fitting will swivel freely, even when subjected to extremely high internal fluid pressure. Thus, in the illustrated construction, a split thrust ring 46 is mounted in an annular external groove 48 which is formed in the cylindrical portion 36 of the inner member 12. As shown, the groove 48 is generally rectangular in cross-section. The illustrated split ring 46 is generally in the form of a disk or thick washer. It will be seen that the illustrated ring 46 is generally rectangular in cross-section. The ring 46 is split into a plurality of parts so that it may readily be removed from and mounted in the groove 48. As shown, the ring 46 has two parts 50 and 52, each of which is generally semicircular in shape.

The right-hand side of the split ring 46 is engageable with the radial shoulder or wall 32 in the outer member 14. As shown, an anti-friction thrust bearing 54 is engageable with the left-hand side of the split ring 46. The illustrated thrust bearing 54 is of the needle type, having a large number of small rollers 56, mounted in a retainer 58. The rollers 56 are radially positioned and are received between thrust washers 60 and 62. The right-hand washer 60 engages the split ring 46 and thus is interposed between the split ring and the rollers 56.

To the left of the anti-friction thrust bearing 54, a retaining ring 64 is removably mounted within the enlarged bore 26 in the outer member 14. As shown, the retaining ring 64 is substantially rectangular in cross-section. The right-hand side of the ring 64 is engageable with the thrust washer 62. The inside of the retaining ring 64 is slidably received over the cylindrical portion 36 of the inner member 12. The outside of the retaining ring 64 is slidably received within the enlarged bore 26.

Means are provided for removably securing the retaining ring 64 within the outer member 14. In this case, the ring 64 is retained by a plurality of set screws 66 which are threaded through radial openings 68 in the outer member 14. Each of the set screws 66 is formed with a cylindrical nose portion 70 which is adapted to be received in a recess 72 formed in the outside of the retaining ring 64. Thus, the set screws 66 prevent the retaining ring 64 from moving within the outer member 14.

To prevent the set screws 66 from loosening accidentally, the outer member 14 is fitted with a locking collar 74 which is substantially cylindrical in shape and may be made of thin tubular metal. The locking collar 74 is received around the cylindrical portion 76 of the outer member 14, into which the set screws 66 are threaded. Thus, the locking collar 74 closes the ends of the set screw openings 68, and covers the ends of the set screws 66, so that they cannot unscrew from the openings 68.

The locking collar 74 is removably retained on the outer member 14. In this case, the right-hand end of the locking collar 74 is formed with a plurality of tabs 78 which are adapted to be bent into an external annular groove 80, formed in the outer member 14.

In operation, the fluid pressure within the swivel fitting 10 tends to push the inner member 12 to the left, out of the outer member 14. Thus, split ring 46 exerts thrust against the right-hand end of the roller thrust bearing assembly 54. The bearing assembly transmits the thrust to the right-hand end of the retaining ring 64. The provision of the rollers 56 and the smooth thrust washers 60 and 62 minimizes the friction in the bearing 54, so that the inner member 12 will swivel freely within the outer member 14, even when the fluid pressure within the swivel fitting is extremely high. Moreover, the anti-friction bearing 54 is highly resistant to ordinary wear, due to the swiveling movement of the inner member 12, relative to the outer member 14.

It is an easy matter to disassemble the swivel fitting 10. First, the tabs 78 are bent out of the groove 80, so that the locking collar 74 may be slipped off the outer member 14. The set screws 66 may then be unscrewed from the openings 68. This permits the withdrawal of the inner member 12 to the left, out of the outer member 14. The inner member carries the split ring 46, the anti-friction bearing assembly 54, and the retaining ring 64 out of the outer member 14. The sealing ring 42 and the back-up ring 44 may then be removed and replaced with new components.

In the reassembly of the swivel fitting 10, the retaining ring 64 and the thrust bearing assembly 54 are slipped over the cylindrical portion 36 of the inner member 12. The split thrust ring 46 is then mounted in the groove 48. The back-up ring 44 and the sealing ring 42 may be mounted around the reduced portion 38 of the inner member 12. Next, the inner member, and the parts assembled thereon, may be slipped into the outer member 14. The retaining ring 64 is secured within the outer member 14 by inserting and tightening the set screws 66. The locking collar 74 may then be replaced to cover the set screws. The tabs 78 are bent into the groove 80 so that the locking collar 74 will be retained on the outer member 14.

The threaded end portions 16 and 18 of the inner and outer members 12 and 14 may extend at any desired angles to the swivel axis of the fitting 10. In this case, the threaded end portion 18 extends along the swivel axis, while the threaded end portion 16 extends at substantially 45 degrees thereto.

Flat surfaces 84 may be formed on the inner member 12 adjacent the threaded end portion 16, for receiving an ordinary wrench, which may be used to hold or turn the inner member 12. Similar flat wrench-engaging surfaces 86 are formed on the outer member 14. To receive locking wires or other locking devices, holes 88 and 90 may be drilled through the inner and outer members 12 and 14, but not communicating with the fluid passages 20 and 22 therein.

It will be apparent that the swivel fitting will swivel freely and will last a long time, even when subjected to extremely high internal pressure. It is an easy matter to disassemble and reassemble the swivel fitting, so that the sealing ring may be replaced periodically. With all of its advantages, the swivel fitting is easy to manufacture and reasonably low in cost.

Various modifications, alternative constructions and equivalents may be employed without departing from the true spirit and scope of the invention, as exemplified in the foregoing description and defined in the following claims.

We claim:

1. A swivel pipe fitting, comprising an outer tubular member, an inner tubular member rotatably received within said outer tubular member, said outer tubular member having a stepped bore having a first relatively large portion, a second portion of intermediate size, and a third portion of relatively small size, said inner tubular member having a first cylindrical portion and a reduced cylindrical end portion, a sealing ring disposed around said reduced end portion of said inner member and received within said second intermediate portion of said stepped bore, said reduced end portion of said inner member extending slidably into and being rotatably received within said third relatively small portion of said stepped bore, said first cylindrical portion of said inner member extending slidably into and being rotatably received within said second intermediate portion of said stepped bore, said outer member having an annular radial wall extending between said first and second portions of said stepped bore, said first cylindrical portion of said inner member having an external annular groove therein, a split generally disk-shaped ring received in said groove and engaging said radial wall of said first member, said split ring being split into a plurality of sectors for easy renewal and mounting in said groove, said split ring corresponding in diameter to said first portion of said bore and being slidably received therein to retain said split ring in said groove, a roller thrust bearing engaging the opposite side of said split ring, a retaining ring slidably received between said first cylindrical portion of said second member and said first relatively large portion of said stepped bore and engaging said thrust bearing on the opposite side thereof from said split ring, a plurality of set screws mounted in said outer tubular member and engaging said retaining ring for securing said retaining ring in said outer tubular member, said retaining ring having recesses for receiving said set screws, a locking collar received around said outer tubular member and covering said set screws for preventing accidental loosening of said screws, and means for retaining said locking collar on said outer tubular member.

2. A swivel pipe fitting, comprising an outer tubular member, an inner tubular member rotatably received within said outer tubular member, said outer tubular member having a stepped bore having a first relatively large portion, a second portion of intermediate size, and a third portion of relatively small size, said inner tubular member having a first cylindrical portion and a reduced cylindrical end portion, a sealing ring disposed around said reduced end portion of said inner member and received within said second intermediate portion of said stepped bore, said reduced end portion of said inner member extending slidably into and being rotatably received within said third relatively small portion of said stepped bore, said first cylindrical portion of said inner member extending slidably into and being rotatably received within said second intermediate portion of said stepped bore, said outer member having an annular radial wall extending between said first and second portions of said stepped bore, said first cylindrical portion of said inner member having an external annular groove therein, a split generally disk-shaped ring received in said groove and engaging said radial wall of said first member, said split ring being split into two substantially semi-circular portions for easy removal and mounting in said groove, said split ring corresponding in diameter to said first portion of said bore and being slidably received therein to retain said split ring in said groove, a roller thrust bearing engaging the opposite side of said split ring, a retaining ring slidably received between said first cylindrical portion of said second member and said first relatively large portion of said stepped bore and engaging said thrust bearing on the opposite side thereof from said split ring, a plurality of set screws mounted in said outer tubular member and engaging said retaining ring for securing said retaining ring in said outer tubular member, said retaining ring having recesses for receiving said set screws, and a locking collar received around said outer tubular member and covering said set screws for preventing accidental loosening of said screws, said outer tubular member having an external annular groove thereon, said locking collar having a plurality of tabs thereon, said tabs being bent downwardly into said annular groove on said outer member for retaining said collar on said outer member.

References Cited in the file of this patent

UNITED STATES PATENTS

| | | |
|---|---|---|
| 1,695,019 | McElroy | Dec. 11, 1928 |
| 2,394,715 | Phillips | Feb. 12, 1946 |
| 2,507,849 | Bland | May 16, 1950 |
| 2,525,652 | Cunningham | Oct. 10, 1950 |
| 2,569,333 | Peterson | Sept. 25, 1951 |
| 2,812,960 | Walsh | Nov. 12, 1957 |
| 2,907,590 | Oswald | Oct. 6, 1959 |
| 2,963,304 | Comlossy | Dec. 6, 1960 |

FOREIGN PATENTS

| | | |
|---|---|---|
| 369,022 | Great Britain | Mar. 17, 1932 |
| 310,355 | Italy | Aug. 11, 1933 |